(12) United States Patent
Sun

(10) Patent No.: US 8,760,860 B2
(45) Date of Patent: Jun. 24, 2014

(54) FASTENING DEVICE FOR HARD DISK DRIVE

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 140 days.

(21) Appl. No.: 13/491,580

(22) Filed: Jun. 7, 2012

(65) Prior Publication Data

US 2013/0271911 A1    Oct. 17, 2013

(30) Foreign Application Priority Data

Apr. 17, 2012   (CN) .......................... 2012 1 0112530

(51) Int. Cl.
*G06F 1/18*    (2006.01)

(52) U.S. Cl.
CPC ..................................... *G06F 1/187* (2013.01)
USPC ....... 361/679.33; 248/244; 312/219; 345/175

(58) Field of Classification Search
CPC ..................................................... G06F 1/187
USPC ........ 345/175, 156, 161; 361/679.33, 679.02, 361/679.48, 679.34, 679.32, 679.31, 361/679.39, 679.22, 679.54, 679.4, 679.08, 361/679.21, 679.36, 679.55, 679.09, 361/679.35, 679.49, 679.38, 679.3; 248/310, 674, 316.8, 220.1, 244, 27.1, 248/210, 222.11, 222.19, 558; 312/223.2, 312/249.11, 326, 219, 265.1, 257.1, 265.5
See application file for complete search history.

(56) References Cited

U.S. PATENT DOCUMENTS

2013/0200238 A1\* 8/2013 Liang et al. ................... 248/310
2013/0258579 A1\* 10/2013 Sun ........................... 361/679.33

\* cited by examiner

*Primary Examiner* — Hung Duong
(74) *Attorney, Agent, or Firm* — Novak Druce Connolly Bove + Quigg LLP

(57) ABSTRACT

A fastening device for a hard disk drive (HDD) includes a bottom plate and two fastening members. Two protrusions protrude from the bottom plate. A positioning portion is fastened to the bottom plate. The positioning portion includes an operation tab. A block protrudes from the operation tab. Each fastening member includes a sidewall, and a top wall and a bottom wall extending from top and bottom sides of the sidewall. The top walls are fastened to a bottom of the HDD. Each bottom wall defines an engaging hole. The engaging hole includes a first hole and two second holes communicating with the first hole. When the HDD is being fastened, the HDD is slid to allow each protrusion to enter one of the second holes, and to allow the block to block a corresponding side of the HDD.

8 Claims, 5 Drawing Sheets

FASTENING DEVICE FOR HARD DISK DRIVE

CROSS-REFERENCE TO RELATED APPLICATIONS

Relevant subject matter is disclosed in two pending U.S. patent applications, both titled "FASTENING DEVICE FOR HARD DISK DRIVE", respectively filed on May 17, 2012, with the application Ser. No. 13/473,630, and filed on May 18, 2012, with the application Ser. No. 13/474,727, which are assigned to the same assignee as this patent application.

BACKGROUND

1. Technical Field

The present disclosure relates to a device for fastening a hard disk drive (HDD).

2. Description of Related Art

Many HDDs are screwed to the brackets in computers, such that the HDDs are rigidly connected to the chassis of the computers, which means any vibrations or shocks to the chassis are easily transferred to the HDDs. When an HDD is operating at a high speed, such vibrations may harm the HDD.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
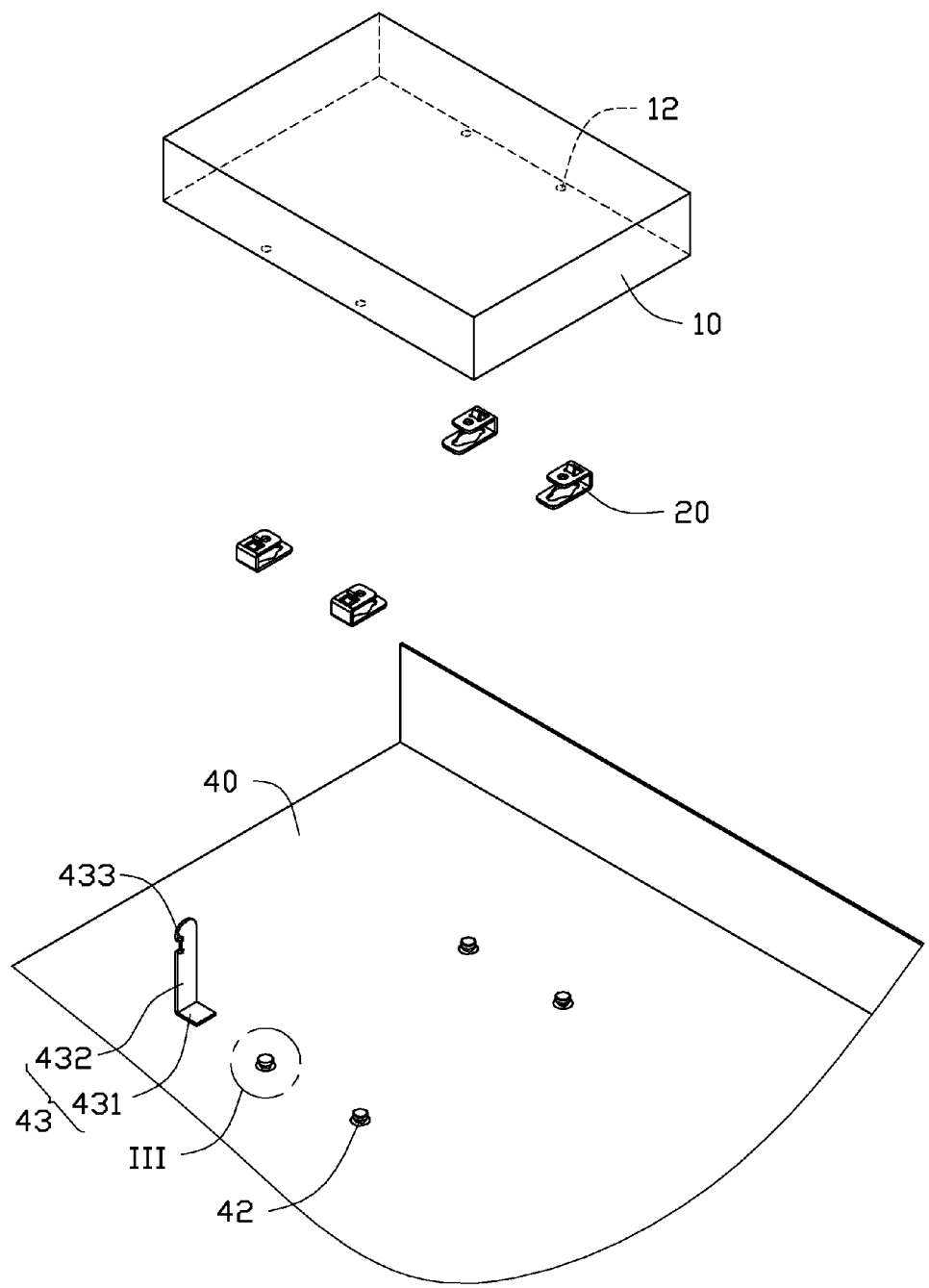
FIG. 1 is an exploded, isometric view of an exemplary embodiment of a fastening device together with a hard disk drive (HDD), wherein the fastening device includes four fastening members.

FIG. 1 shows an exemplary embodiment of a fastening device for a hard disk drive (HDD) 10. Four mounting holes 12 are defined in a bottom of the HDD 10, adjacent to opposite sides of the HDD 10 respectively. The fastening device includes a bottom plate 40 and four fastening members 20. In another embodiment, the number of fastening members 20 can be varied, based on need.

Figure 2:
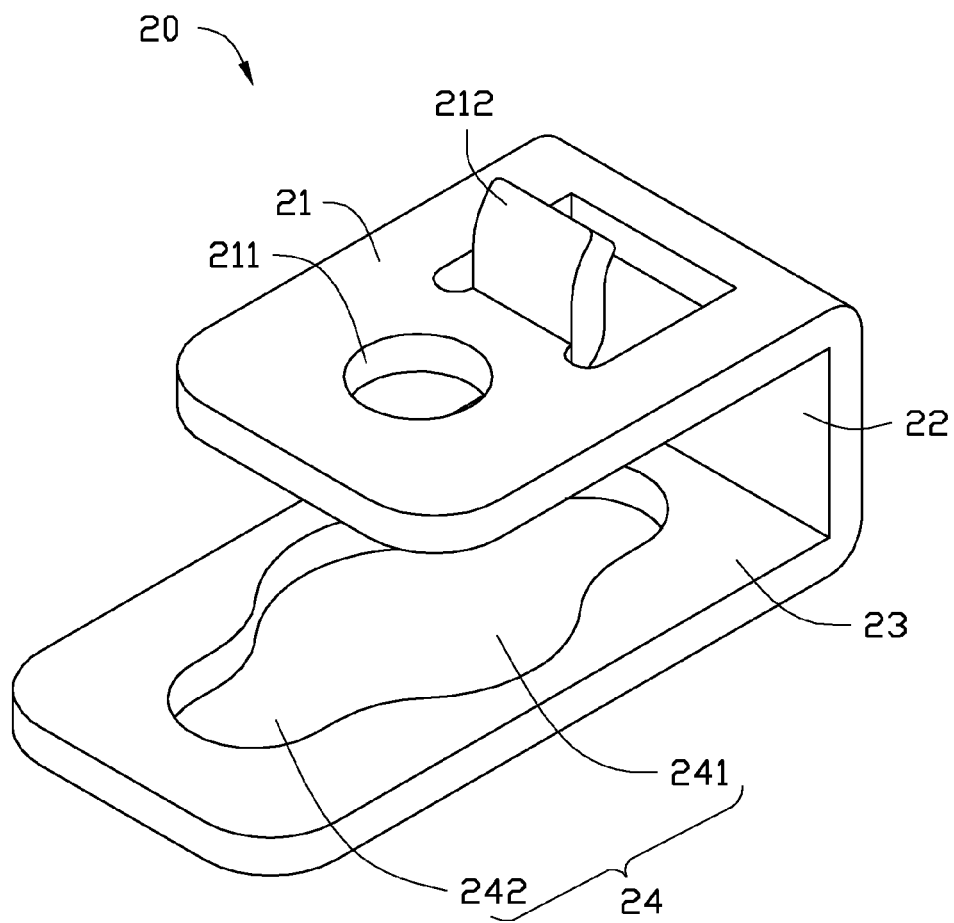
FIG. 2 is an enlarge view of one of the fastening members of FIG. 1.

FIG. 2 shows each fastening member 20 including a sidewall 22, and a top wall 21 and a bottom wall 23 extending from top and bottom sides of the sidewall 22, respectively. A through hole 211 is defined in the top wall 21. A stopping tab 212 extends up from the top wall 21 in a substantially perpendicular manner, adjacent to the sidewall 22 relative to the through hole 211. An engaging hole 24 is longitudinally defined in the bottom wall 23. The engaging hole 24 includes a first hole 241, and two second holes 242 communicating with the first hole 241 at opposite sides of the first hole 241. The first hole 241 has a larger diameter than a diameter of the second holes 242.

Figure 3:
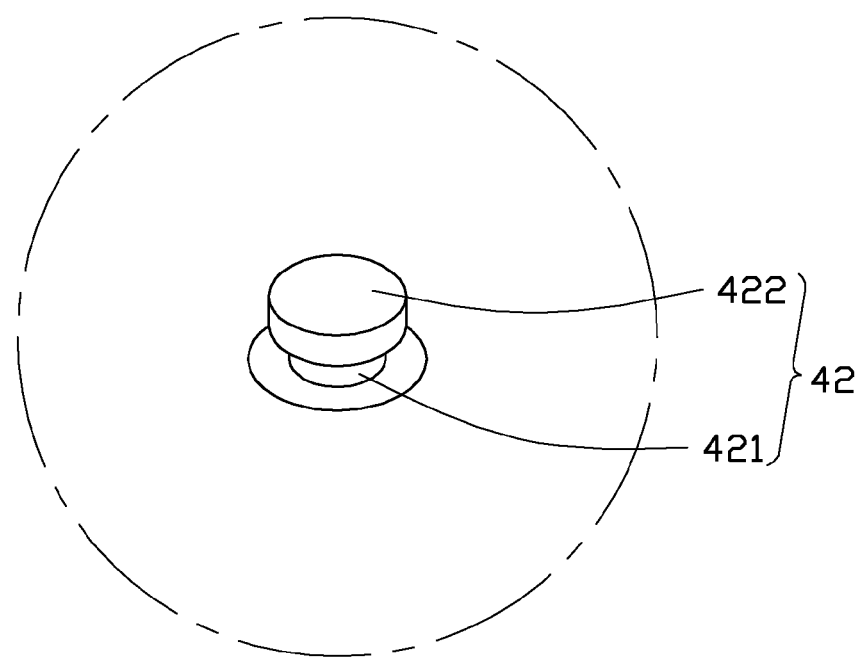
FIG. 3 is an enlarged view of a circled portion III of FIG. 1.

FIGS. 1 and 3 show four protrusions 42 protruding up from the bottom plate 40. The protrusions 42 form the four corners of a rectangle. Each protrusion 42 includes a neck 421 extending up from the bottom plate 40 and a head 422 formed on a top end of the neck 421. The head 422 has a larger diameter than a diameter of the neck 421. A substantially L-shaped positioning portion 43 is formed on the bottom plate 40, at the left side of the two front protrusions 42. The positioning portion 43 includes a fastening tab 431 fastened to the bottom plate 40 and an operation tab 432 perpendicularly extending up from a side of the fastening tab 431. Two blocks 433 are formed on a front side of the operation tab 432, above the fastening tab 431.

Figure 4:
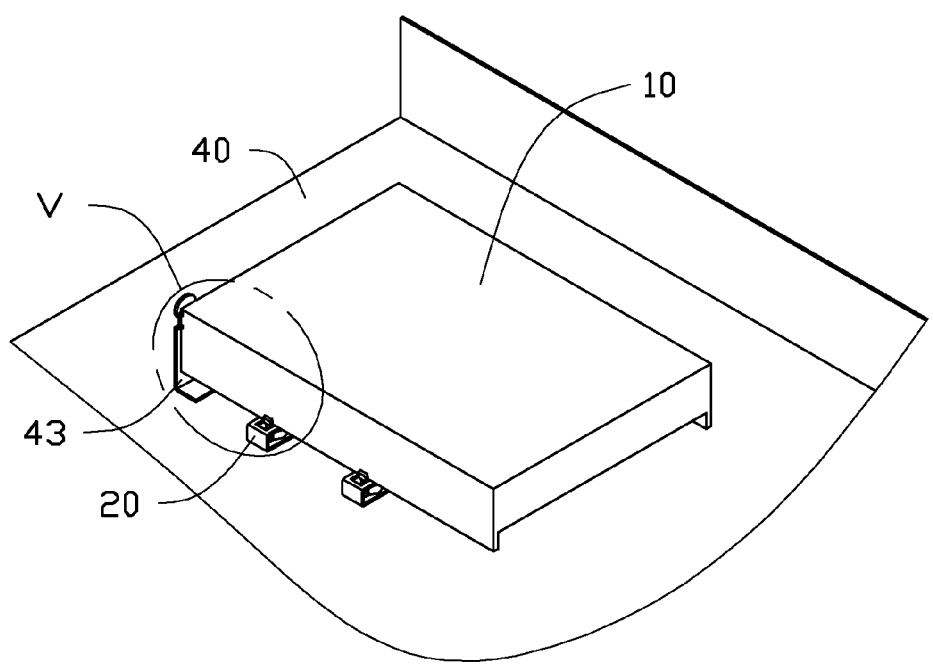
FIG. 4 is an assembled, isometric view of FIG. 1.
Figure 5:
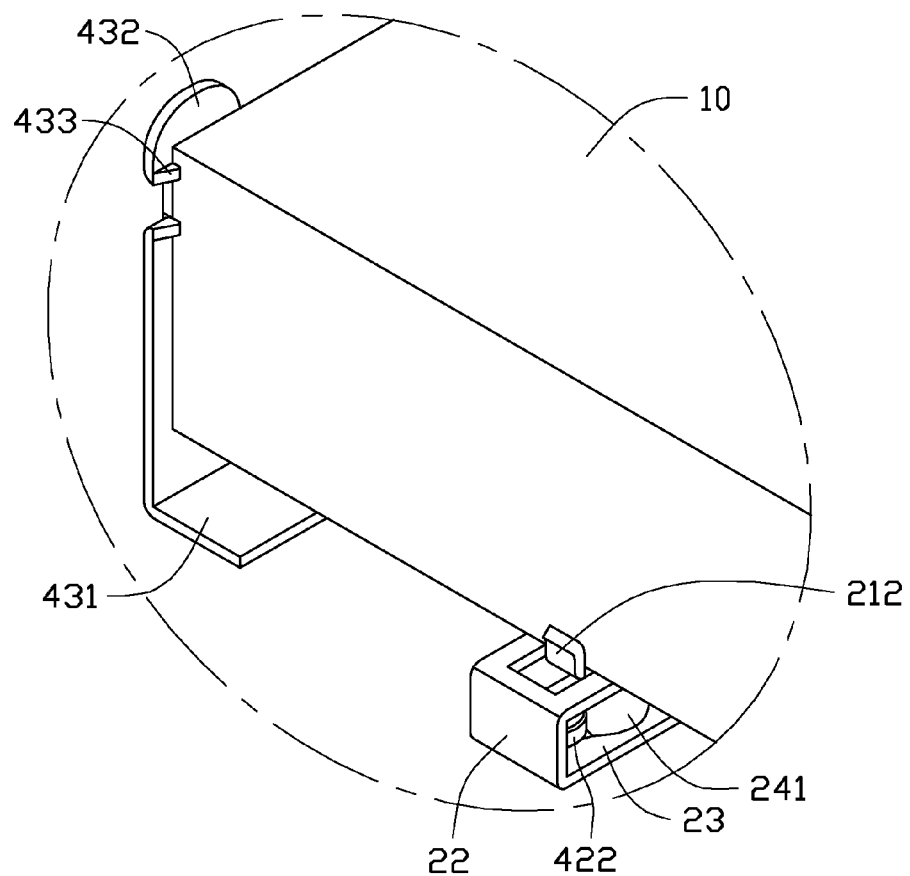
FIG. 5 is an enlarged view of a circled portion V of FIG. 4.

FIGS. 4 and 5 show in assembly, the top walls 21 are placed on the bottom of the HDD 10. The through holes 211 are aligned with the corresponding mounting holes 12. The stopping tabs 212 block opposite sides of the HDD 10. Four screws extend through the corresponding through holes 211, and engage in the corresponding mounting holes 12. Therefore, the fastening members 20 are fastened to the bottom of the HDD 10.

The HDD 10 together with the fastening members 20 is placed above the bottom plate 40. The first holes 241 align with the corresponding protrusions 42. The operation tab 432 is manipulated to be deformed away from the protrusions 42. The HDD 10 is manipulated downward, to make the protrusions 42 extend through the corresponding first holes 241. The bottom walls 23 abut against the bottom plate 40. The HDD 10 is slid backward on the bottom plate 40. The necks 421 move to respectively engage in the front second holes 242 of the engaging holes 24, and the heads 422 abut against the corresponding bottom walls 23. The operation tab 432 is released. The operation tab 432 is restored to abut against a left end of the HDD 10. The blocks 433 block the front side of the HDD 10. Therefore, the HDD 10 is fastened to the bottom plate 40.

The HDD 10 is fastened to the bottom plate 40 by the fastening members 20. A certain distance exists between the bottom plate 40 and the HDD 10. When the fastening members 20 are subjected to vibrations or shocks, the fastening members 20 can be deformed to absorb at least part of vibration energy.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A fastening device for a hard disk drive (HDD), comprising:
    a bottom plate, two protrusions protruding up from the bottom plate, a positioning portion formed on the bottom plate, the positioning portion comprising an operation tab perpendicular to the bottom plate, a block protruding from the operation tab; and
    two fastening members each comprising a sidewall, and a top wall and a bottom wall perpendicularly extending from top and bottom sides of the sidewall, the top walls to be fastened to a bottom of the HDD, each bottom wall defining an engaging hole, the engaging hole comprising a first hole and two second holes communicating with the first hole at opposite sides of the first hole, the first hole having a larger diameter than the second holes;

wherein when the HDD is being fastened, the HDD is slid to allow each protrusion to enter one of the second holes from the corresponding first hole, and to allow the block to block a side of the HDD.

2. The fastening device of claim 1, wherein each protrusion comprises a neck extending up from the bottom plate and a head formed on a top of the neck, the head has a larger diameter than the neck, the neck engages in the corresponding second hole after entering the second hole, the head abuts against the corresponding bottom wall.

3. The fastening device of claim 1, wherein two stopping tabs extend up from the corresponding top walls, to abut against opposite sides of the HDD.

4. The fastening device of claim 1, wherein the positioning portion further comprises a fastening tab fastened to the bottom plate, the operation tab perpendicularly extends up from a side of the fastening tab.

5. A hard disk drive (HDD) assembly, comprising:

a bottom plate, two protrusions protruding up from the bottom plate, a positioning portion fastened to the bottom plate, the positioning portion comprising an operation tab perpendicular to the bottom plate, a block protruding from the operation tab;

an HDD; and two fastening members each comprising a sidewall, and a top wall and a bottom wall perpendicularly extending from top and bottom sides of the sidewall, the top walls fastened to a bottom of the HDD, each bottom wall defining an engaging hole, the engaging hole comprising a first hole and two second holes communicating with the first hole at opposite sides of the first hole, the first hole having a larger diameter than the second holes;

wherein when the HDD is being fastened, the HDD is slid to allow each protrusion to enter one of the second holes from the corresponding first hole, and to allow the block to block a side of the HDD.

6. The HDD assembly of claim 5, wherein each protrusion comprises a neck extending up from the bottom plate and a head formed on a top of the neck, the head has a larger diameter than the neck, the neck engages in the corresponding second hole after entering the second hole, the head abuts against the corresponding bottom wall.

7. The HDD assembly of claim 5, wherein two stopping tabs extend up from the corresponding top walls, to abut against opposite sides of the HDD.

8. The HDD assembly of claim 5, wherein the positioning portion further comprises a fastening tab fastened to the bottom plate, the operation tab perpendicularly extends up from a side of the fastening tab.

\* \* \* \* \*